Sept. 10, 1963   J. N. MORAN   3,103,341
FLUSH MOUNTED PLUG VALVE
Filed Dec. 19, 1960
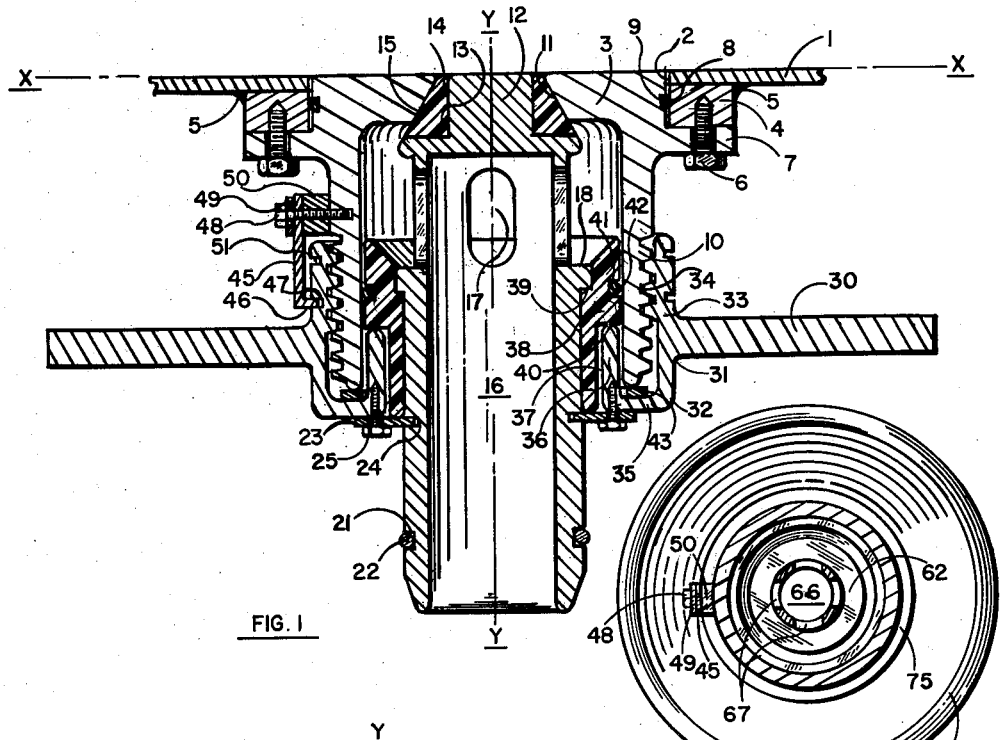
FIG. 1
FIG. 3
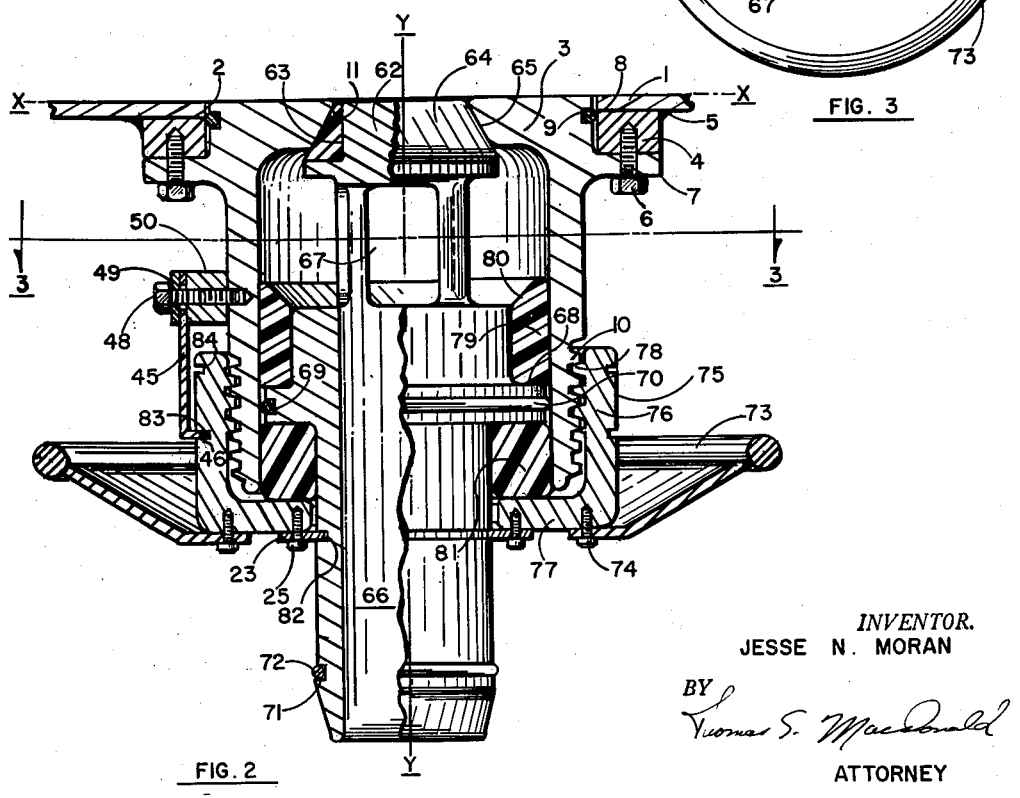
FIG. 2
INVENTOR.
JESSE N. MORAN
BY
ATTORNEY

United States Patent Office 3,103,341
Patented Sept. 10, 1963

3,103,341
FLUSH MOUNTED PLUG VALVE
Jesse N. Moran, Bartlesville, Okla., assignor to
North American Aviation, Inc.
Filed Dec. 19, 1960, Ser. No. 76,802
1 Claim. (Cl. 251—115)

This invention relates to a flush mounted plug valve and more particularly relates to a flush mounted plug valve assembly particularly adapted for use with a mixing container wherein it is desired to expeditiously discharge a mixed constituent contained therein.

Various manufacturing operations prevalent in chemical industries, and in particular the operational steps necessitated for the manufacture of rocket propellant materials, require a flush mounted type plug valve assembly suitable for expeditious and efficient discharge of the materials from a reaction or mixing container. Although such a requirement is particularly apparent in conjunction with the manufacture of highly viscous type rocket propellants, such a requirement is also felt in the general chemical art wherein it is desired to provide for the uniform mixing of two or more chemical constituents. One of the problems encountered in attempting to provide such a valve is one of not being able to provide a sufficiently large discharge opening with minimum obstruction to flow while at the same time providing an expeditiously actuated plug valve having an accurately maintained flush surface with respect to the inside of the mixing container when the valve is in closed position. Also, it is desirable to provide a valve wherein the relatively sliding juxtaposed surfaces do not provide for metal to metal contact. Such an alleviation of sliding metal to metal contact is especially important wherein one of the moving elements is exposed to the discharged mixed constituent. As well as fulfilling the above requirements it is further desirable to provide a valve which can be easily disassembled for cleaning and maintenance purposes. Since many of the materials used in the manufacture of uniformly mixed rocket propellants are highly viscous in nature; the above stated problems are greatly magnified therewith.

Although the prior art discloses many plug type valves, such valves do not generally provide for the highly efficient and expeditious in-line discharge of mixed constituents. Accordingly, the problems and solutions thereof do not particularly answer the rocket propellant manufacturing problems wherein highly viscous type materials are processed. Also, the mixing of such highly viscous and explosive type propellant constituents requires an accurately maintained and ultra-flush plug valve-mixing container mating surface in order to alleviate undesirable turbulence and friction in the mixing container.

The present invention has substantially overcome the above stated problems by providing a flush mounted plug valve assembly adapted to have the upper surface thereof accurately positioned in the same plane which defines the inner surface of the mixing container. A shell member means forms an opening on the upper extremity thereof and a valve plug means is slidably mounted therein, downwardly of said opening, for selectively closing or opening said opening for permitting the unrestricted flow of a constituent through said valve plug means. An adjustment means is operatively connected to said shell member means and said valve plug means for selectively opening and closing said opening.

An object of this invention is to provide a flush mounted plug valve wherein expeditious and efficient discharge of the materials from a reaction or mixing container may be readily achieved.

Another object of this invention is to provide a flush mounted plug valve assembly which affords a sufficiently large discharge opening with minimum obstruction to constituent flow.

A further object of this invention is to provide a flush mounted plug valve assembly providing an expeditiously actuated plug valve having an accurately maintained flush surface with respect to the inside of a mixing container when said valve is in closed position.

A still further object of this invention is to provide a flush mounted plug valve assembly which may be easily disassembled from a mixing container wall for cleaning and maintenance purposes.

A still further object of this invention is to provide a flush mounted plug valve wherein metal to metal sliding contact is substantially alleviated.

These and other objects of this invention will become apparent from the following description taken in connection with the accompanying drawings, in which:

FIG. 1 is a cross-sectional view of a first preferred valve assembly embodiment in closed position, employing the novel concepts of this invention.

FIG. 2 is a cross-sectional view, partly in elevation, disclosing a second preferred valve assembly embodiment in closed position, employing the novel concepts of this invention.

FIG. 3 is a cross-sectional view taken on lines 3—3 of FIG. 2.

The purpose of this invention is to provide a flush mounted plug valve assembly adapted to have the upper surface thereof accurately positioned in the same plane which defines the inner surface of a constituent filled container. A stationary shell member forms an opening on the upper extremity thereof and houses a hollow valve plug means which is slidably mounted therein, downwardly of said opening, for selectively closing or opening said opening for permitting the precisely controlled flow of a constituent through said valve plug means. A flange means radially extends from the substantial mid portion of said valve plug means and an adjusting means cooperates with an outer portion of said stationary shell member and with the flange means of said valve plug means for selectively opening and closing said opening. Bearing guide means are provided between said valve plug means and said adjusting means to prevent metal to metal contact at those juxtaposed portions of the assembly which are exposed to constituent flow.

FIG. 1 discloses a first preferred valve assembly embodiment employing the novel concepts of this invention. The valve assembly is shown in closed position. A container wall 1 defines the mixing container which functions to contain a chemical constituent therein, for example, a highly viscous type rocket propellant. A preferably circular shaped discharge opening 2 is formed in the container wall 1 and is adapted to receive the upper extremity of a cylindrically shaped valve shell member 3 therein. A reinforcing and adapter ring 4 is fixedly secured to the container wall 1 by a circumferentially extended weld bead 5. A preselected number of bolts 6 are threadably secured to the reinforcing ring 4 to thereby affix the flange portion 7 of valve shell member 3 in predetermined axial alinement (relative to axis Y—Y) with respect to the container wall discharge opening 2. A conventional type O-ring seal 8 is axially retained in a peripheral groove 9 formed on the valve shell member and functions to prevent passage of constituents thereby, as shown.

Conventional thread means 10 are formed on the periphery of the downwardly extending cup portion of the valve shell member 3 in order to facilitate the precise axial adjustment of the plug valve assembly as will be hereinafter explained. The valve shell member 3 is further constructed and arranged to provide a frustum type conically shaped valve seat 11.

A valve plug or piston member 12 has a circumferentially extending cutout portion 13 formed on the upper periphery thereof adapted to retain a valve plug seat member 14 which is preferably in press-fit relationship therewith. As shown, the ring shaped valve plug seat member 14 has an outer seating surface 15 preferably formed as a frustum of a cone which engages with the valve seat 11 formed in the valve shell member 3. The valve plug seat member 14 is preferably constructed of "Teflon" (tetrafluoroethylene) or other suitable type material hereinafter mentioned which function to provide a positive sealing action thereat during extreme operating conditions. It is important that such a material retain its desired sealing characteristics when subjected to the extreme operating temperatures and pressures prevalent in the mixing container. Such a seat member is also preferably constructed of a material which is chemically inactive when subjected to preselected mixed constituents which flow thereagainst when discharged from the mixing container. It should be particularly noted that due to such a construction and arrangement of the seating surface 15 of the seat member 14 a positive sealing action is assured thereat during extreme operating conditions. Furthermore, the transferred constituents expelled from the mixing container are accurately guided into the port 17 and passage 16 with a minimum of turbulence.

The valve plug member 12 further comprises a longitudinally extending valve passage 16 formed on the longitudinal axis Y—Y and a plurality of intake ports 17 formed in the side walls thereof adapted to receive and pass the flowing constituent therethrough. Although in the preferred embodiment of FIG. 1 four such ports have been shown, it should be understood that any number thereof may be employed depending on the type of constituent being passed therethrough and the desired relative rates at which such constituents are transferred.

A flange portion 18 extends radially, substantially from the mid-portion of the valve plug member 12 for purposes hereinafter set forth. A groove 21 is formed on the lower extremity of the valve plug member 12 and is adapted to retain conventional type O-ring seal 22 therein should this portion of the valve plug member be selectively projected into a constituent receiving container bore or the like.

A split ring member 23 is retained in a circumferentially extending retaining groove 24 as shown. A preselected number of set screws 25 are utilized to retain the axially movable valve plug member 12 relative to an adjustment means as shown. It is generally desirable to remove the split ring member during actuation of the valve member 12.

The selective vertical adjustments of valve plug member 12 are effected by a handle 30 radially projecting from an adjustable nut member 32. The handle 30 may be of any conventional type, for example, a solid disc member as shown or in lieu thereof, plurality of radially projecting lever arms. The adjustable nut member 32 preferably comprises a U-shaped cross-section providing a first upstanding cylindrical wall portion 33 internally threaded at 34, a base portion 35 and a second upstanding cylindrical wall portion 36. The inwardly facing surface 37 of the second leg portion 36 provides for a hereinafter explained sleeve bearing type function.

A vertically disposed bearing guide ring 38 surrounds the valve plug member 12 and is preferably press-fitted thereon. An inwardly facing recessed portion 39 axially abuts the flange portion 18 of the valve plug member 12 to prevent further upward axial movement of the bearing guide ring. An outwardly facing recessed portion 40 axially abuts the wall portion 36 of the adjustable nut member 32 for purposes hereinafter set forth. A circumferentially extending groove 41 is formed on the periphery of the bearing guide ring 38 and functions to retain a conventional type O-ring seal 42 therein.

A bearing abutment ring member 43 functions to receive and bear against the lower end of the relatively stationary valve shell member 3 so as to alleviate damage to the adjustable nut member 33 and provide a limit stop thereat when the valve plug member 12 is actuated in an upward direction. In the preferred embodiment, the bearing guide member 38 and the bearing abutment ring 43 are preferably constructed of the same material utilized to form the valve plug member 14. It is preferably desired to utilize a rigid, high compressive strength type plastic material which has a softening point above the maximum desired mixing container operating temperatures and pressures. The material may comprise, for example, polyethylene, polypropylene, Teflon (tetrafluoroethylene) or nylon and the like.

*Method of Operation*

The above explained FIG. 1 preferred embodiment provides an expeditiously actuated assembly affording very efficient selective discharge of a processed constituent. The selective rotation of the handle 30, effected by either a manual or an automatic operator, will function to selectively actuate the valve plug member 12 in an upward direction due to the axial movements and coaction of upstanding bearing leg portion 36 against the underside of the recessed portion 40 of the bearing guide ring 38. Such an axial force is simultaneously imparted to the flange portion 18 of the valve plug member 12 by means of the inwardly facing recessed portion 39, as shown.

When the upper exposed surface of the valve plug member is flush with respect to the inner surface of the container wall 1 as shown (plane X—X), the valve plug member can be retained in relatively stationary axial position by inserting the set screws 25 through the split ring 23 and affixing the same to the adjustable nut member 32.

The utilization of a spring type finger member 45, having an inwardly extending latch portion 46, provides the desired positive locking function, as shown. To provide such a positive type locking function the latch portion 46 is adapted to fixedly engage a circumferential groove 47 formed on the periphery of adjustable nut member 32. The finger member 45 is secured to the valve shell member 3 by means of a conventional type bolt 48 which projects through a lock washer 49, the finger member 45 and an adapting type block washer 50 as shown. Although one specific type of flocking means has been shown for illustration purposes, it should be understood that other type locking means may be readily employed in lieu thereof. For example, a locking means may be selectively attached to the handle 30 and a relatively stationary juxtaposed member (not shown).

A second circumferentially formed groove 51 is formed on the upper peripheral extremity of the upstanding leg portion 33 of adjustable nut member 32 and is adapted to receive the latch portion 46 of the spring member 45 when the valve plug member is thus downwardly moved into constituent discharge flow or open position.

When it is desired to actuate the valve into lower or open position, the finger member 45 is removed by unscrewing the bolt 48 to thereby permit selective rotation of the handle 30. As hereinbefore stated, the set screws 25 may be removed from the split ring 23 during such an actuating step to prevent undue binding between the adjustable nut member 3 and the valve member 12. When the adjusting means is actuated to thereby lower the adjustable nut member 32 to its desired position along the axis Y—Y, it becomes apparent that due to the impact of the discharged constituent flow onto the valve member 12, that said valve member will be urged downwardly.

In view of the above disclosed valve construction it should be particularly noted that the exposed surface of the plug valve may be very expeditiously and accurately alined in the Y—Y plane which defines the inner surface of the container wall 1. Such a desired alinement is made possible due to the fact that the exposed surface of the plug valve is prefabricated in flush mounted relationship with respect to the upper exposed surface of the valve shell member 3. The valve shell member's upper exposed surface comprises a relatively large area and therefore may be more accurately placed in the plane defining the inner surface of container wall 1. With such a pre-fabrication technique it is possible to very accurately form the exposed surfaces of the plug valve assembly into any desired configuration such as flat, curved, etc.

FIG. 2 discloses a second preferred embodiment employing the novel concepts of this invention with the like numerals thereof disclosing the identical parts shown in the FIG. 1 preferred embodiment.

A valve plug or piston member 62 has a circumferentially extending cutout portion 63 formed on the upper end thereof adapted to receive a valve plug seat member 64. The valve plug seat member 64 is preferably formed as a frustum of a cone and is adapted to have the outer seating surface 65 thereof axially pressed against the valve seat 11 formed in the valve shell member 3. The valve plug seat member 64 is also preferably constructed of a "Teflon" type material or any other substantially equivalent material such as those hereinbefore disclosed.

As more clearly shown in FIG. 3 the valve plug member 62 further comprises a longitudinal passage 66 formed on the longitudinal axis Y—Y thereof and a plurality of intake ports 67 formed in the upper side wall portions as shown. It should be noted that in this particular embodiment the ports 67 are somewhat larger and more rectangular in shape in order to afford a greater entrance area than provided by the oval shaped ports 17 of the FIG. 1 embodiment.

It is apparent that with the structural relationships afforded in the FIG. 2 embodiment as well as those disclosed in FIG. 1, it is possible to expeditiously disassemble a valve plug member which is designed for extremely efficient discharge of one particular constituent and substitute in lieu thereof a second valve plug member which functions to fulfill the desired functions relating to a second constituent having a different viscosity. As hereinbefore stated, it is one of the objects of this invention to provide such an expeditiously disassembled plug valve assembly which assembly can readily compensate for discharge constituents of varying viscosities.

A flange portion 68 extends radially from substantially the mid-portion of the valve plug member 62 and comprises a peripherally formed groove 69 adapted to retain an O-ring seal 70 of the conventional type. A groove 71 is formed on the lower extremity of the valve plug member 62 and is also adapted to retain an O-ring seal 72 therein should this portion of the valve plug member be selectively projected into a container bore or the like.

The vertical adjustments of the valve plug member 62 are effected by rotating the conically shaped and circumferentially positioned actuating wheel 73 which is secured by set screws 74 to an adjustable nut member 75. The adjustable nut member 75 has an L-shaped cross-section comprising a first upstanding leg portion 76 and an inwardly extending base portion 77. The adjustable nut member 75 is internally threaded at 78 and engages with the threads 10 formed on the valve shell member 3 to provide for selected axial movements of the nut member.

A guide bushing 79 circumferentially surrounds the valve plug member 62 and has a dished or tapered portion 80 which provides for very efficient reception and passage of the flowing constituents. A guide ring 81 is positioned beneath the radially extending flanged portion 68 as shown. The guide bushing 79 and guide ring 81 are preferably press-fitted on to the valve plug member 62 and retained in their relative axial positions during all axial movements of the valve plug member 62. In the preferred embodiment of FIG. 2 the guide bushing and guide ring are also preferably constructed of a rigid plastic type material having a softening point about the maximum desired operating temperature. High density polyethylene, polypropylene, Teflon (tetrafluoroethylene), nylon are suitable materials for most applications.

As shown, the selective rotation of handle 73, which may be effected either by a manual or automatic operator, functions to actuate the valve plug member 62 in an upward direction due to the upward movements of inwardly extending base portion 77 of the adjustable nut member 75. The guide bushing 79 and guide ring 81 are fabricated to afford a near perfect seal with respect to the inwardly facing bearing wall of the shell member 3 while yet functioning to provide a near non-friction type sliding action therebetween.

When the upper exposed surface of the valve plug member is flush with respect to the inner surface of the container wall 1, that is it rests in the plane X—X thereof as shown, the valve plug member 62 can be retained in relatively stationary axial position relative to the adjustable nut member 75. Such a function may be expeditiously achieved by first inserting the screws 25 through the split ring 23 which is axially retained in a peripheral groove 82 formed on the valve plug member and then affixing the screws to the said nut member. It may be desirable to affix the split ring in such a manner during all modes of operation, however, such a structural relationship might effect undesirable binding and subsequent rotation of the valve plug member 62.

The utilization of the above described spring type finger member 45 with latch portion 46 thereon provides for positive retention of the valve plug member in the same manner as explained in connection with the FIG. 1 preferred embodiment. The circumferentially extending retaining grooves formed on the adjustable nut member 75 have been numbered 83 and 84, respectively, as shown.

The above described structural relationships afforded by the above explained preferred embodiments provide for a flush mounted plug valve assembly which may be very precisely mounted with respect to a container wall. The ease with which such valves may be expeditiously disassembled for cleaning and maintenance purposes is also apparent. It should be further noted that the utilized valve plug members and cooperating juxtaposed surfaces of the respective valve shell and adjustable nut members are maintained out of contact during all stages of valve actuation. Such a function is particularly advantageous when highly explosive type rocket propellant constituents are discharged from the mixing chamber since the generation of the slightest spark due to sliding metal to metal could foreseeably function to ignite such constituents.

Although this invention has been described and illustrated in detail, it is to be understood that the same is by way of illustration and example only and is not to be taken by way of limitation, the spirit and scope of this invention being limited only by the terms of the appended claim.

I claim:

A flush mounted plug valve assembly adapted to have the upper surface thereof accurately positioned in the same plane which defines the inner surface of a container comprising:

a stationary shell member having a frusto-conical opening on the upper extremity thereof, an elongated valve plug means having a frusto-conical sealing means, said plug slidably mounted in said shell member downwardly of said opening for selectively closing or opening said frusto-conical opening for permitting the flow of a constituent through said valve, said valve plug means having a plurality of intake ports formed therein adjacent said frusto-conical sealing means and a valve passage formed on a longitudinal axis of said plug means cooperating with said intake ports and the frusto-conical opening formed on said shell member, flange means radially extending from the substantial mid-portion of said valve plug means, an adjusting means for selectively moving said valve plug means relative to said stationary shell member to thereby selectively open and close said opening, said adjusting means comprising a first cylindrical wall portion radially exterior of an outer portion of said stationary shell member, a second cylindrical portion radially interior of an outer portion of said shell member and a base portion connecting said first and said second cylindrical wall portions, bearing guide means surrounding said valve plug means adjacent said flange means for guiding said valve plug means during sliding movements thereof, said guide means comprising a cylindrical-shaped portion constructed and arranged in abutting relation to said valve plug means and said adjusting means, split ring retaining means fixedly secured to said adjusting means and cooperating with recess means formed on said valve plug means for positively retaining said valve plug means relative to said adjusting means, and latch retaining means fixedly secured to said stationary shell member and cooperating with recess means formed on said adjusting means for positively retaining said adjusting means relative to said stationary shell member.

References Cited in the file of this patent

UNITED STATES PATENTS

| 588,357 | Rowe | Aug. 17, 1897 |
| 917,529 | Bloom | Apr. 6, 1909 |
| 1,681,209 | Atkinson | Aug. 21, 1928 |

FOREIGN PATENTS

| 363,161 | France | Apr. 26, 1906 |
| 1,064,285 | France | Dec. 23, 1953 |
| 324,074 | Switzerland | Oct. 15, 1957 |
| 1,240,285 | France | Aug. 1, 1960 |

OTHER REFERENCES

Oberursel: V6513XII/47g, Aug. 23, 1956 (German printed application).